United States Patent [19]

Marchant

[11] Patent Number: 4,970,660
[45] Date of Patent: Nov. 13, 1990

[54] ACCUMULATED STATISTICS CONSTANT FALSE ALARM RATE METHOD AND DEVICE

[75] Inventor: Jeffrey D. Marchant, Tempe, Ariz.

[73] Assignee: Motorola, Inc., Schaumburg, Ill.

[21] Appl. No.: 409,975

[22] Filed: Sep. 19, 1989

Related U.S. Application Data

[63] Continuation-in-part of Ser. No. 215,119, Jul. 5, 1985, abandoned.

[51] Int. Cl.⁵ .............................................. G01S 7/34
[52] U.S. Cl. ................................... 364/517; 364/570; 364/574; 342/90; 342/91; 342/93
[58] Field of Search ............... 364/516, 517, 570, 574, 364/571.07, 579; 342/90, 91, 93

[56] References Cited

U.S. PATENT DOCUMENTS

| 3,925,650 | 12/1975 | Brown | 364/570 |
|---|---|---|---|
| 3,968,490 | 7/1976 | Gostin | 342/93 |
| 4,099,075 | 7/1978 | Goldberg et al. | 364/517 |
| 4,101,889 | 7/1978 | Evans | 342/93 |
| 4,137,532 | 1/1979 | Taylor, Jr. et al. | 342/93 |
| 4,159,477 | 6/1979 | Le Beyec | 342/93 |
| 4,321,688 | 3/1982 | Sado et al. | 364/554 |
| 4,513,286 | 4/1985 | Irabu | 342/93 |
| 4,532,639 | 7/1985 | Price et al. | 342/93 |
| 4,536,764 | 8/1985 | Freeman | 342/91 |
| 4,586,043 | 4/1986 | Wolf | 342/93 |
| 4,635,217 | 1/1987 | O'Connor et al. | 364/574 |
| 4,646,254 | 2/1987 | O'Connor et al. | 364/574 |
| 4,665,402 | 5/1987 | Young | 342/91 |
| 4,684,989 | 8/1987 | Roeder et al. | 364/517 |
| 4,718,028 | 1/1988 | Gussin et al. | 364/516 |
| 4,851,854 | 7/1989 | Drogin | 364/517 |

Primary Examiner—Parshotam S. Lall
Assistant Examiner—Brian M. Mattson
Attorney, Agent, or Firm—Jordan C. Powell; Maurice J. Jones

[57] ABSTRACT

An accumulated statistics CFAR method and device operates using integrated data to maximize the probability of target detection for a given false alarm rate. The CFAR hardware varies its detection criteria as a function of the statistics of the range gate in question. The detection threshold is based on other range gates seen in the past which contain the same terrain type.

15 Claims, 3 Drawing Sheets

ACCUMULATED STATISTICS CONSTANT FALSE ALARM RATE METHOD AND DEVICE

This application is a continuation-in-part of prior application Ser. No. 215,119, filed July 5, 1988 now abandoned.

BACKGROUND OF THE INVENTION

The present invention generally relates to constant false alarm rate (CFAR) signal processors, and in particular, to a CFAR which determines a threshold level based upon accumulated statistics.

In prior art, CFARs have been developed which use a range cell or range gate averaging technique. These CFARs average the data from cells near a test cell with the assumption that the terrain and environmental conditions covered by these cells are similar to the terrain and environmental conditions of the test cell. The difficulties with this type of CFAR are that terrain conditions may vary drastically from one cell to the next. This could result in a threshold level being set too high for the test cell and masking actual targets. Another problem is multiple targets. Using cell averaging techniques, if there are subsequent targets located in the cells to be averaged, they may cancel out a target located in the test cell. In CFAR using cell averaging, in order to obtain an acceptable false alarm rate, threshold levels may be higher than necessary due to inaccuracies in terrain and environmental conditions data resulting in a reduced probability of target detection.

SUMMARY OF THE INVENTION

The present invention pertains to an accumulated statistics CFAR. The CFAR circuitry of the present invention operates on the integrated data streams consisting of sixteen consecutive filter values from an FFT (fast Fourier transform) or some integrated number of FFTs to maximize the probability of target detection for a given false alarm rate. Each set of sixteen consecutive filter values form a clutter spread representing a terrain type. The accumulated statistics CFAR comprises a microprocessing unit (MPU), statistics means, threshold means and histogram means. The statistics means contains a statistics memory and logic circuitry which stores the average of each frequency filter value having the same amplitude, for all range gates having the same clutter spread and clutter amplitude (i.e. having the same terrain type).

Histogram means coupled to the microprocessing unit and containing a histogram memory records the frequency with which each terrain type occurs, and records target detection counts for each filter for each terrain type.

The MPU is coupled to threshold circuitry which contains a threshold memory. After the CFAR has operated for a given amount of time and the statistical means has gathered sufficient samples, the MPU reads the data from the statistics memory. It then uses these values to set a threshold level. The MPU also clears the histogram memory. The threshold level is then tested and corrected by the MPU with subsequent runnings of the device.

It is an object of the present invention to provide a new and improved CFAR.

It is a further object of the present invention to improve target detection sensitivity.

It is a further object of the present invention to eliminate false alarms due to abruptly changing terrain.

It is another object of the present invention to increase detection probability in multiple targets situations.

It is a further object of the present invention to provide a CFAR with a false alarm rate that is customer selectible and is measurable in the CFAR circuitry.

It is another object of the present invention to provide a CFAR capable of separate target thresholding for any range cells which may contain second-time-around clutter.

These and other objects of the present invention will become apparent to those skilled in the art upon consideration of the accompanying specification, claims and drawings.

DESCRIPTION OF THE PREFERRED EMBODIMENT

The present invention is an accumulated statistics CFAR signal processor which may be used in any radar system requiring high performance moving target detection. The present invention processes radar video signals which have been divided into range gates. The number of range gates the video signal is divided into is a function of how much resolution is desired. In an embodiment of the present invention, a 150 kilometer field with 30 meter resolution is desired, thus resulting in 5,120 range gates. In the present invention, the signal from each range gate is integrated by an FFT resulting in an integrated data stream. The signal from each range gate is represented in the integrated data stream by frequency data consisting of, in this embodiment, the amplitude values of 16 frequency filters, ($F_0$ through $F_{16}$). These terms and methods are well-known in the art and for that reason, have not been discussed in greater detail.

Figure 3:
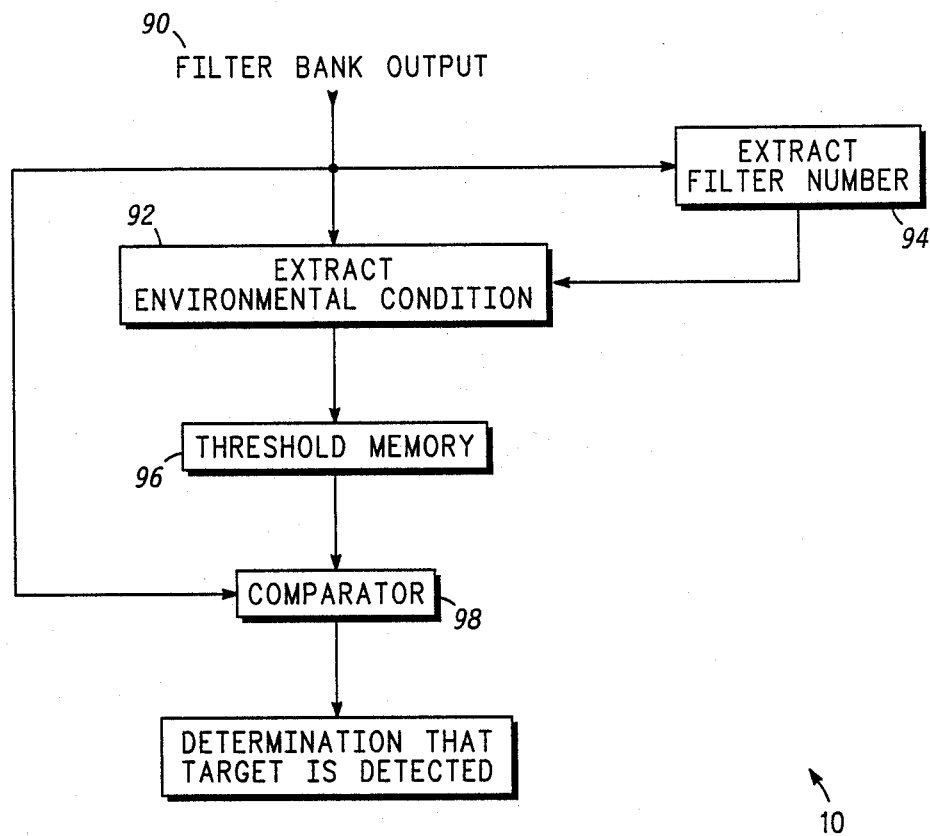
FIG. 3 is a flow diagram of the operation of the present invention.

The flowchart of FIG. 3 is provided to help one with skill in the art of radar to better understand the following detailed description of the present invention. As shown in FIG. 3, an accumulated statistics CFAR (constant false alarm rate) 10 receives a filter bank output 90. Filter bank output 90 is a set of equally spaced (in the frequency domain) band pass filters such as an FFT (fast Fourier transform) output. Each range gate contains an independently calculated filter bank output. An environmental condition is extracted from filter bank output 90 as represented by box 92. The environmental condition is comprised of at least one of the filter bank outputs, and may be a combination of more than one filter bank output, such as a DC amplitude output and a CFS (clutter frequency spread) amplitude output. The environmental condition may also contain a processed parameter, such as an average output or peak detected output. The environmental condition may be combined with other parameters such as a filter number, as represented by box 94, radar PRF (pulse repetition frequency) number, or RF (radar frequency) number. This combination defines a threshold memory address which is input into a threshold memory, represented by box 96.

A threshold stored in a memory location defined by the threshold memory address is then output to a comparator (represented by box 98). The comparator compares the threshold value from the threshold memory with the filter value received from filter bank output 90. If the filter value is greater than the value of the threshold memory, a target is declared as detected (box 100).

Figure 1:
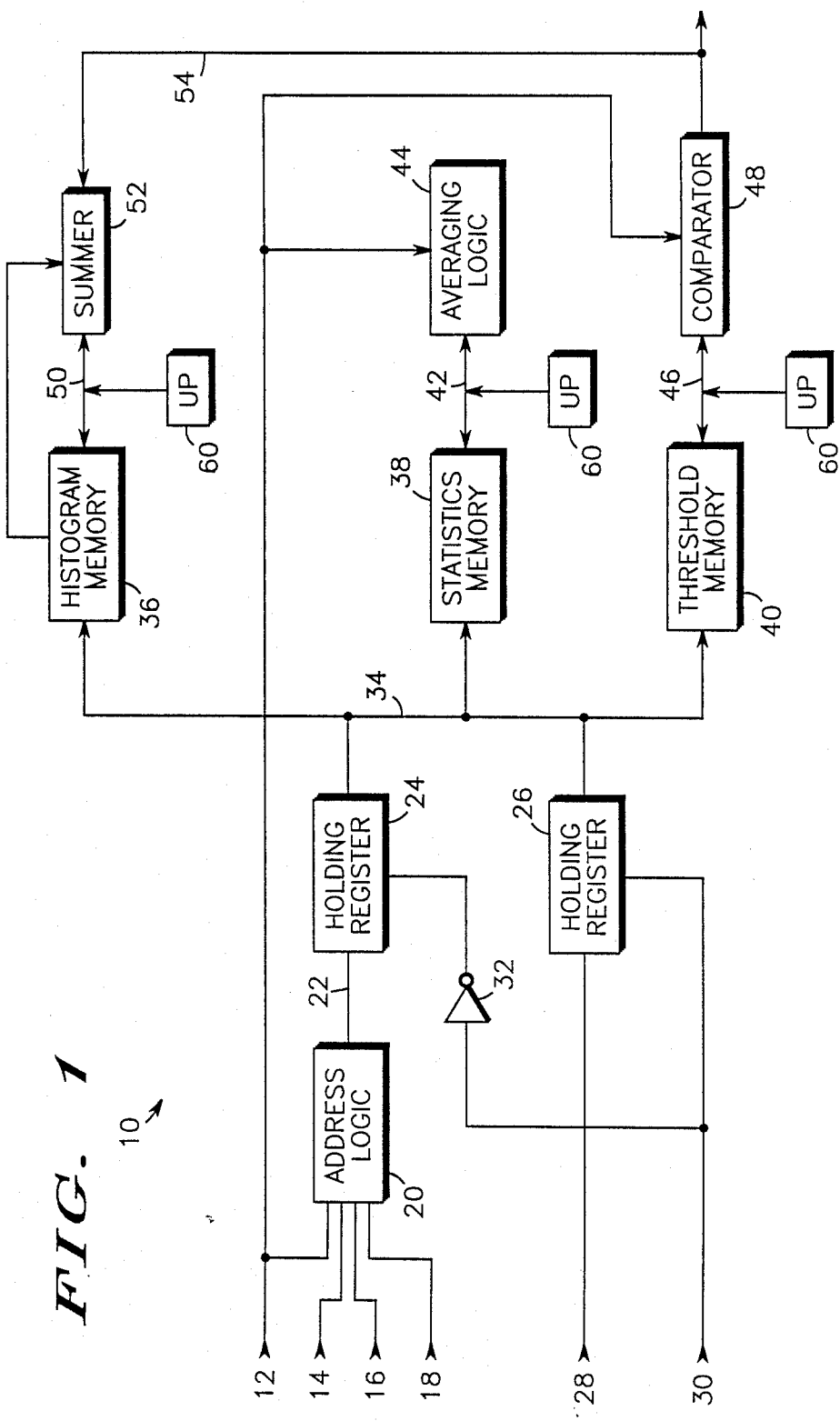
FIG. 1 is a simplified block diagram of an embodiment of the present invention.

Referring now to FIG. 1, a simplified block diagram of an accumulated statistics CFAR is designated 10. Integrated data bus 12, filter number bus 14 and leads 16 and 18 are connected to address logic 20. Address logic 20 logically prepares data from integrated data bus 12 to produce an address. An address bus 22 connects address logic 20 and a holding register 24. A microprocessor address bus 28 is connected to a holding register 26. A control lead 30 is coupled to holding register 26 and an inverter 32. Inverter 32 is then coupled to holding register 24. Control lead 30 carries a bit which determines which holding register operates at a given time. It should be understood that there are many ways of controlling which of two holding registers is operating at a given time and in this embodiment inverter 32 is used. An address bus 34 couples holding register 24 and holding register 26 to histogram memory 36, statistics memory 38 and threshold memory 40. A data bus 42 connects statistics memory 38, an averaging logic circuit 44 and a microprocessor 60. A data bus 46 connects threshold memory 40, a comparator 48 and microprocessor 60. Data bus 12 is connected to averaging logic 44 and comparator 48. Data bus 50 connects histogram memory 36, summer 52 and microprocessor 60. Comparator 48 is connected to summer 52 via bus 54.

As the signal from the range gate of interest is processed, 16 filter values are produced resulting in a means for determining terrain type. Filters $F_0$ and $F_2$ are used to address statistics memory 38 in which filters $F_3$ through $F_{16}$ are stored. $F_0$, $F_2$ determine clutter amplitude, clutter spread, respectively. Each clutter spread, clutter amplitude combination represents a terrain type. When the values from filters $F_0$ and $F_2$ from one range gate equal the values from another rage gate, it can be assumed that these terrain types are closely matching. $F_1$ is not used because it provides little new information due to the properties of weighing in the FFT.

Figure 2:
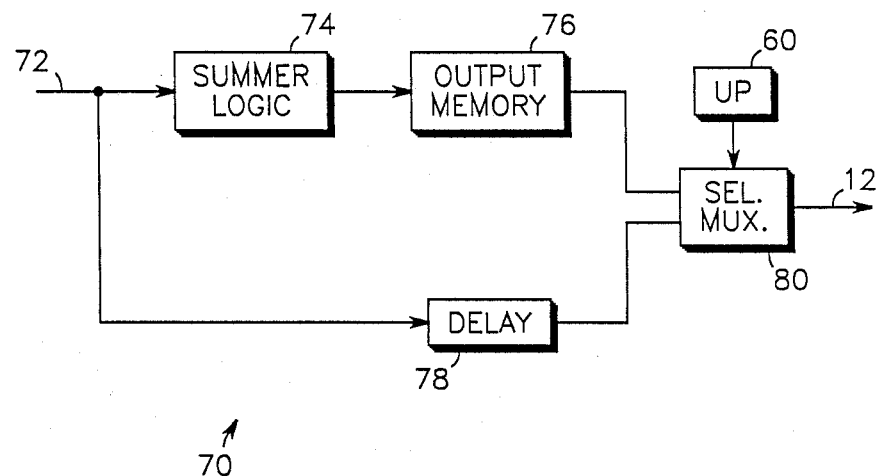
FIG. 2 is a simplified block diagram of a modification to the device illustrated in FIG. 1.

Each one of the sixteen consecutive filter values for the range gate of interest, in this embodiment, enters CFAR 10 sequentially via integrated data bus 12 as a 10-bit data stream. The data from filters $F_0$ and $F_2$ enter address logic 20 where each is compressed into 4 bits. In this specific embodiment, the 4 bits used for $F_0$ are actually the 4 most significant bits of the full $F_0$ amplitude, and the 4 bits of filter 2 data are a logarithmically compressed version of the full $F_2$ amplitude. While this is the preferred embodiment, for data having second-time-around (S-T-A) possibilities, $F_0$ data can be replaced with a logarithmically compressed versions of the average of the 3 smallest amplitudes within $F_4$ to $F_8$ inclusive of the range gate of interest, and $F_2$ data can be replaced with a logarithmically compressed version of the average of the 6 smallest amplitudes within $F_9$ to $F_{16}$ inclusive of the range gate of interest. The reason the two largest amplitudes are eliminated in each case is to allow for the possibility of a target in the range gate of interest. FIG. 2 is a simplified block diagram of S-T-A compensator circuitry generally designated 70, used when an S-T-A compensated address is desired. An integrated data stream enters S-T-A compensator 70 via a data bus 72. Summer logic 74 having an input coupled to data bus 72 and having an output, first, produces the sum of, in this embodiment, the three lowest amplitudes from filter values $F_4$ through $F_8$, and the sum of the six smallest amplitudes from filter values $F_9$ to $F_{16}$. Filter values $F_0$ through $F_3$ are not used since being low frequency filters, they would almost certainly be included in the high amplitudes that are discarded. An output memory 76 having an input coupled to the output of said summer logic 74 and having an output, stores the data produced in summer logic 74. A delay 78 having an input coupled to data bus 72 and an output, delays the integrated data stream until summer logic 74 has processed said filter values from said integrated data stream. A selective multiplexer 80 has a first input coupled to said output of said output memory 76, a second input coupled to said output of said delay 78 and a third input coupled to said microprocessor 60 and having an output connected to said integrated data bus 12 of CFAR 10 in FIG. 1. Selective multiplexer 80, upon a signal from microprocessor 60 can pass data from either output memory 76 or delay 78 to CFAR 10 of FIG. 1. Delay 78 delays the integrated data stream so that the $F_0$ data enters selective multiplexer 80 at the same time the $F_4$ through $F_8$ data from output memory 76 enters selective multiplexer 80 and the $F_2$ data from delay 78 enter selective multiplexer 80 at the same time the $F_9$ through $F_{16}$ data from output memory 76 enters selective multiplexer 80. Upon the possibility of S-T-A clutter, microprocessor 60 signals selective multiplexer 80 to allow data from output memory 76 to enter CFAR 10 of FIG. 1 and the $F_0$ and $F_2$ data from delay 78 is not allowed to pass. The data from output memory 76 is now logarithmically compressed in address logic 20 of FIG. 1. It then enters holding register 24 as part of an address. The rest of the integrated data steam, filters $F_3$ through $F_{16}$ pass through the selective multiplexer 80 and enter CFAR 10 of FIG. 1. If S-T-A clutter is not possible, the selective mutliplexer 80 is signalled by microprocessor 60 to block the output of output memory 76 and allow filter values $F_0$ through $F_{16}$ from delay 78 to enter CFAR 10.

Alternatively, $F_2$ data can be replaced with any other filter amplitude logarithmically compressed to 4 bits. It is anticipated that the averages described above will be utilized only when operating on a range gate with an S-T-A clutter possibility, since in such an area an S-T-A occurrence will manifest itself as noise in a non-coherent environment, and thus will tend to affect all frequency filters equally. Using an amplitude average as part of the thresholding lookup provides a means for automatically raising the target threshold in such an area. However, the MPU can choose whether to replace the $F_0$ and $F_2$ values or not. Since an address bit is already allocated for S-T-A areas, using $F_0$ and $F_2$ and simply raising the threshold for the S-T-A side of the threshold memory is another possibility. A way of checking the effectiveness of both approaches is borne from the histogram memory, which is described later. In this embodiment, address logic 20 inserts the altered portion of the integrator data stream, which in the preferred embodiment is the compressed filter $F_0$ and $F_2$ values into holding register 24. A 14-bit address is then formed using data from bus 14, lead 16 and lead 18. Statistics memory 38 is divided into 4 parts. Lead 16 and lead 18 each carry a bit which together address one of these quadrants. Since the statistics vary with PRF (pulse repetition frequency), half of the statistics memory is dedicated to each PRF of the given mode. For example, half of the memory is dedicated for the lower PRF of 650 hertz and half is dedicated to the data corresponding to the higher PRF or 850 hertz. Thus, lead 16 carries a bit which addresses between the two halves. The two PRF modes are used so that a target having the same frequency as one of the modes, and thus being masked, would become visible with the other mode. Also, the statistics are expected to vary more in range areas where there exists the possibility of a second-time-around (S-T-A) clutter, so the memory is again divided in half as a function of the possibility of such clutter. Effectively, this gives 4 separate statistics memories. Lead 18, carries a bit which specifies whether the possibility of second-time-around exists or not. The control bit which indicates whether or not S-T-A clutter is possible is under the ultimate control of the microprocessor, which calculates where this bit should change value as a function of range and aircraft altitude, and which commands the CFAR control hardware to cause the transition at the proper point in real time. Bus 14 supplies 4 bits which specify which of the sixteen consecutive filters is being stored in statistics memory 38. The address of a filter value, is the altered integrated data stream data in holding register 24, which will only be changed when each new integrated data stream is entered into CFAR 10, the filter number data, which is changted with each filter value, the S-T-A clutter data, and the PRF mode data. Address logic 20 regulates the combination of the filter number data with the other data to form an address for each filter value.

As each filter value is stored in statistics memory 38 sequentially from $F_3$ to $F_{16}$ under its specific terrain type, designated by filters $F_0$ and $F_2$ and the filter number, address locations for each terrain type will begin to fill. Holding register 24 containing an address, addresses the statistics memory 38 for a given terrain type and filter number. If there is any data in the memory at this address, it is inserted into averaging logic 44 where it is averaged with the incoming data then restored in the statistics memory 38. Averaging logic 44 averages a percentage of the new value with a percentage of the old value. The statistics memory stores the data calculated by the following equation:

$$S_{new} = K \times S_{old} + (1-K) \times D$$

where
 D=data from the integrator for the filter of interest for the range gate of interest;
 $S_{old}$=data already stored in the statistics memory for the filter of interest from other range gates containing the same filter 0 value and the same filter 2 value (the same terrain type);
 K=a constant controlled by the MPU; and
 $S_{new}$=new data to store in the statistics memory.

Thus, statistics memory 38 contains, in the steady state, the average of each filter amplitude for all range gates having the same clutter level and range type spread. The address from holding register 24, that is, the $F_0$ and $F_2$ compressed values address a $F_0$ location in histogram memory 36 which is incremented by 1, thereby keeping an account of how many times a specific terrain type has been encountered.

After a sufficient amount of operating time, control lead 30 signals inverter 32, which blocks holding register 24 and activates holding register 26. Holding register 26 will hold the addresses from microprocessor 60 via address bus 28. Microprocessor 60 can now read the data from the statistics memory to get an estimate of the averaged values. It then sets the corresponding thresholds to that averaged value and stores them in threshold memory 40 addressed by holding register 26 via address bus 34. Microprocessor 60, at this point, also clears histogram memory 36. CFAR 10 is then operated again for a predetermined amount of time with the data for each filter being compared with the threshold level for that filter in comparator 48. In histogram memory 36, the number of times a terrain type occurs is stored in the filter $F_0$, location. This is also the maximum number of times each filter in that type of terrain or clutter spread could exceed its target threshold. The filter $F_0$ location is used to count the number of times each terrain type occurs, because the filter $F_0$ value is not used for target detection, and this location is not used for counting target detections. Filters $F_3$ through $F_{16}$ memory locations store the number of times a target was detected in those filters for each terrain type. If the incoming filter data is greater than the threshold data from threshold memory 40, when compared in comparator 48 indicating a target detection, summer 52 increments that filter location of the given terrain type in histogram memory 36. Each filter location for each terrain type contains the number of times that filter's amplitude did exceed its corresponding threshold. The memory is limited to 16 bits, in this embodiment, so once the terrain type count location reaches 65,535, updating to all associated filter target detection counts is disabled. Once CFAR 10 has run for a predetermined amount of time comparing filter values to their corresponding threshold level, the microprocessor can calculate the false alarm rate by dividing filter target detection counts by the associated count in the terrain type location. Once the false alarm rate has been determined, the following equation can be used to set the final threshold level to obtain the desired false alarm rate:

$$TC1/TCf = T1/Tf$$

where
 T1=actual threshold value used initially;
 TC1=normalized threshold value corresponding to T1;
 TCf=desired final normalized threshold value; and
 Tf=final actual threshold to give desired false alarm rate.

The initial calculation of the false alarm rate by the microprocessor implicitly assumes real target detections are negligible when compared with false alarm detections. A measured actual false alarm rate of less than 3%, where real target detections mights start to manifest their statistical significance, is given special treatment in threshold calculations.

Another method for determining the final threshold level is that once the microprocessor knows the false alarm rate for the given thresholds, it then increases the thresholds by 15% or 20%, clears the histogram memory and runs the CFAR for a specified amount of time as before, until the histogram contains sufficient data. The microprocessor calculates the new false alarm rates corresponding to the new thresholds. The microprocessor now has, for each filter for each terrain type, two different false alarm rates corresponding to two different thresholds, and can then determine the threshold for the desired false alarm rate. This determination is made by utilizing the following equation:

$$Tf = T1 + (TCf - TC1) \times (T2 - T1)/(TC2 - TC1)$$

where

T1=actual threshold value used initially;
T2=actual second threshold value;
TC1=normalized threshold value corresponding to T1;
TC2=normalized threshold value corresponding to TC;
TCf=desired final normalized threshold value; and
Tf=final actual threshold to give desired false alarm rate.

The values for TC1 and TC2 are precalculated for 1000 different false alarm rates for both a 4-record integration period and an 8-record integration period. Thus, the false alarm rate associated with T1 is rounded to the nearest 0.1% and is then used as an address to a TC look-up table. TCF is known since the desired false alarm rate is known. Thus, the MPU has all information necessary to calculate TF.

If, for T1 and T2, the measured false alarm rate is less than 0.03, the following equation is utilized:

$$TF = (T1 \text{ or } T2) * k$$

where k=a number solely based on integration period.

A second embodiment of the present invention includes the addition of another parameter in the environmental condition. The parameter is the average of the high frequency filter outputs after one or more of the highest amplitude high frequency filters have been removed. If the range gate in question has a target within the high frequency filters, the target must be removed to calculate the threshold for that particular range gate. When a range gate has STA clutter, the average of the high frequency filters is increased. Therefore, if a few of the highest amplitude high frequency filters are removed, the effect on the average is negligible. Therefore, a target may be removed from the threshold without adversely affecting the threshold determination.

An additional embodiment of the present invention removes threshold memory of FIGS. 1 and 3 from the operational loop. Referring to FIG. 1, a multiplier (not shown) is coupled to the output of statistics memory 38. The multiplier is then coupled to comparator 48 in lieu of threshold memory 40. The output of statistics memory 38 is multiplied in the multiplier with a number or set of numbers which are functions of the desired false alarm rate. The products of statistics memory output and the false alarm rate factors are the final thresholds which would otherwise be received from threshold memory 40. It should be noted that this process only takes information from range gates having similar clutter statistics rather than from surrounding range rates.

There is thus provided by the present invention a substantially improved CFAR. In setting the target detection thresholds, the CFAR hardware actually measures the mean and standard deviation for the amplitudes of all frequency components in all types of terrain. Thus, false alarms due varying terrain types is greatly reduced.

Having thus described the invention, it will be apparent to those of skill in the art, that various modifications can be made within the spirit and scope of the present invention.

I claim:

1. A method for detecting a moving target comprising the steps of:
   receiving a filter bank output from a filter bank having a plurality of filters for a specific range gate;
   extracting at least one environmental condition from said filter bank output, said environmental condition being a function of said filter bank output amplitudes;
   defining a threshold memory address from said at least one environmental condition;
   relaying the threshold memory address to a threshold means;
   said threshold means supplying at least one threshold value;
   retrieving a threshold value from a memory location corresponding to said threshold memory address within said threshold means;
   comparing said threshold value with a filter frequency amplitude; and
   generating a target detection signal if said filter frequency amplitude is greater than said threshold value.

2. The method according to claim 1 wherein the method further comprises, prior to said step of receiving a filter and bank output, generating a plurality of predetermined thresholds to be used as the contents of said threshold means.

3. The method according to claim 2 wherein said step of generating a plurality of thresholds comprises:
   determining a probability distribution function curve for each of said plurality of filters relating to each of said at least one environmental conditions, said curve having a first axis for a false alarm rate and a second axis for said threshold;
   storing within said threshold means a threshold value from said curve representing a desired false alarm rate.

4. The method according to claim 3 wherein said step of determining a probability distribution function curve comprises the steps of:
   gathering a set of numbers comprising a first subset, said first subset representing a number of times each of said at least one environmental conditions occurred;
   said set of numbers further comprising a second subset, said second subset representing a number of times a target is detected in each of said plurality of filters for each at least one environmental condition;
   calculating a set of false alarm rates (FAR) by dividing each number within said second subset by a number in said first subset, said number in said first subset corresponding to said at least one environmental condition of each number within said second subset;
   plotting said set of FAR with a set of estimated thresholds onto said probability distribution function curve;
   repeating said steps of gathering a set of numbers, calculating a set of FAR, and plotting said set of FAR for a desired number of points on said probability distribution function curve.

5. The method according to claim 4 wherein said step of plotting said set of FAR comprises generating a set of estimated thresholds within a statistics memory circuit.

6. The method according to claim 5 wherein said step of generating a set of estimated thresholds comprises the step of continously calculating each of said average frequency filter amplitudes for each at least one environmental condition.

7. A method for detecting a moving target comprising the steps of:
   receiving a filter bank output from a filter bank having a plurality of filters for a specific range gate;
   extracting a DC amplitude from said filter bank output;
   extracting a clutter frequency spread amplitude from said filter bank output;
   combining said DC amplitude and said clutter frequency spread (CFS) amplitude;
   generating a threshold memory address by combining said DC amplitude and said CFS amplitude combination with a filter number representing one of said plurality of filters;
   relaying the threshold memory address to a threshold means for supplying at least one threshold value;
   retrieving a threshold value from a memory location corresponding to said threshold memory address within said threshold means;
   supplying said threshold value to a comparator;
   comparing within said comparator said threshold value with a filter frequency amplitude; and
   generating a target detection signal if said filter frequency amplitude is greater than said threshold value.

8. The method according to claim 7 wherein the method further comprises generating a plurality of thresholds for said threshold means prior to said step of receiving a filter bank output.

9. The method according to claim 8 wherein said step of generating a plurality of thresholds comprises:
   determining a probability distribution function curve for each of said plurality of filters relating to said DC amplitude and CFS amplitude combination, said curve having a first axis for a false alarm rate and a second axis for said threshold values;
   storing within said threshold memory a threshold value from said curve representing a desired false alarm rate.

10. The method according to claim 9 wherein said step of determining a probability distribution function curve comprises the steps of:
   gathering a set of numbers comprising a first subset, said subset representing a number of times said DC amplitude and CFS amplitude combination has occurred;
   said set of numbers further comprising a second subset, said second subset representing a number of times a target is detected in each of said plurality of filters for said DC amplitude and CFS amplitude combination;
   calculating a set of false alarm rates (FAR) by dividing each number within said second subset by a number in said first subset, said number in said first subset corresponding to said DC amplitude and CFS amplitude combination of each number within said second subset;
   plotting said set of FAR with a set of estimated thresholds onto said probability distribution function curve;
   repeating said steps of gathering a set of numbers, calculating set of FAR, and plotting said set of FAR for a desired number of points on said probability distribution function curve.

11. The method according to claim 10 wherein said step of plotting said set of FAR comprises generating a set of estimated thresholds within a statistics memory circuit.

12. A moving target detector comprising:
   extraction means for extracting filter bank output values from an input to generate an environmental condition, said environmental condition being a function of said filter bank output amplitudes, said environmental condition representing at least a subset of a memory address;
   memory means for storing a plurality of threshold values, said memory means coupled to said extraction means to receive said at least a subset of said memory address;
   comparator means, said memory means coupled to said comparator means to relay a threshold value stored in a memory location addressed by said at least a subset of said memory address;
   comparator means receiving said filter bank output values and comparing said threshold value with a value from said filter bank output values; and
   said comparator means outputting a target detect signal if said value from said filter bank output values are greater than said threshold value.

13. The moving target detector according to claim 12, wherein the detector further comprises:
   filter number means receiving said filter bank output values;
   said filter number means for extracting a filter number from said filter bank output values;
   said filter number means coupled to said extraction means to supply said filter number to said extraction means; and
   said filter number concatenated with said at least a subset of a memory address to define the parameters of said memory address.

14. The moving target detector according to claim 12 wherein the detector further comprises:
   means for determining said threshold values;
   said means for determining coupled to said threshold means.

15. The moving target detector according to claim 12 wherein the detector further comprises:
   means for averaging a plurality of high frequency filters received from said filter bank output values;
   said means for averaging coupled to said extraction means to supply said average of a plurality of high frequency filters to said extraction means; and
   said average of a plurality of high frequency filters combined with said at least a subset of a memory address to define parameters of said memory address.

* * * * *